Patented July 20, 1948

2,445,714

UNITED STATES PATENT OFFICE 2,445,714

MANUFACTURE OF METHYLFURAN

Robert F. Holdren, Ames, Iowa, assignor to Iowa State College Research Foundation, Ames, Iowa, a corporation of Iowa No Drawing. Application November 13, 1945, Serial No. 628,365

8 Claims. (Cl. 260—345)

This invention delates to an improved process of producing methylfuran from a liquid furan derivative. More specifically it relates to a process of producing methylfuran by treating a liquid furan derivative while in the vapor phase with gaseous hydrogen in contact with a catalyst.

An object of my invention is to produce methylfuran from a liquid furan derivative more economicallly than heretofore. Another object of the invention is the employment in said process of a compact mass particularly adapted for the selective reduction of a liquid furan derivative to methylfuran. Still another object of the invention is the production of methylfuran in good yields and of high quality by a process operating practically continuously over comparatively long periods of time. A further object of my invention is a process of producing methylfuran which takes advantage of certain readily available industrial chemicals. These chemicals are the liquid furan derivatives which include, for example, the inexpensive solvent furfural, or one of its reduction products furfuryl alcohol.

I have discovered that methylfuran may be prepared in substantially quantitative yields by the partial reduction of a liquid furan derivative while in the vapor phase with a hydrogen containing gas and in contact with a catalyst comprising a mixture or combination of oxides of copper and chromium and one or more metallic oxides which contribute to the desired reaction such as oxides of metals of the second group of the periodic system particularly calcium or barium. Furthermore, in practicing my process I have discovered that the life of such a catalyst is virtually unlimited. Such oxide catalysts are usually coated on carriers and an object of my invention is to produce a coated carrier in which the coating is coherent and adherent so that the tendency of the catalyst to depreciate due to dusting is minimized. A catalyst prepared in accordance with my invention is porous and hence produces a large available surface for catalytic action.

In accordance with one aspect of the present invention, the furan derivative is vaporized, admixed with hydrogen gas and then passed over a catalyst which is brought to the proper temperature by suitable heating means. The hydrogenation products consisting of water, methylfuran, and the unchanged furan derivative are condensed and the excess hydrogen recirculated through the catalyst chamber. After separating the water and organic layers the methylfuran is purified by distillation.

While I have operated at temperatures of from 140–280° C., for best results I prefer to operate at about 200–225° C. Temperatures over 280° C., are detrimental to catalyst activity and at temperatures much below 200° C., the rate of hydrogenation is slow. In this process I preferably operate in the presence of an excess of hydrogen which is constantly returned to the catalyst. By following the process as described in my invention, in which about five times as much hydrogen, as is theoretically required for the reduction of the furan derivative to methylfuran, is used yields up to 95% of theory can be produced on a single passage through the catalyst chamber.

Any suitable carrier in conjunction with the catalyst may be employed; however, I prefer activated charcoal of about 4 to 10 mesh size. The use of activated carbon as a carrier permits a weight ratio of catalyst to carrier of at least 1 to 1, which is essential for good conversion in one pass over the catalyst. Still better results are obtained when a ratio of catalyst to carrier of 1.16–1.20 to 1 is employed.

I prefer to impregnate a porous carrier as described above with a copper chromite catalyst. A carrier impregnated and coated with at least an equal weight of the copper chromite catalyst has been found very satisfactory.

The invention will be described in connection with the following example which is given for illustrative purposes only, it is not being intended to limit the procedure to the details given since the process can be varied throughout wide limits without departing from the spirit or scope of the invention. All parts are by weight.

EXAMPLE

Part 1: Preparation of catalyst

Eleven hundred sixty parts of a solution containing 260 parts of $Cu(NO_3)_2.3H_2O$ and 31 parts of $Ca(NO_3)_2.4H_2O$ were added to 995 parts of a solution containing 151 parts of $(NH_4)_2Cr_2O_7$ and 202 parts of 28 per cent $NH_4OH$. The precipitate was filtered, the cake pressed with a spatula and sucked as dry as possible, after which it was dried in an oven at 75° C.–80° C. for 12 hours and then pulverized. In carrying out the decomposition, I prefer to decompose the catalyst in a rotary kiln where good temperature control is possible. Although the catalyst may be decomposed at a temperature of 400–450° C. and still show good activity as a reduction catalyst, I prefer to decompose the resulting product within a temperature range of 300–350° C. A supported catalyst of the preferred weight ratio is prepared as follows: 30 parts of dry activated lump charcoal (4-10 mesh) are immersed in distilled water for three to five minutes and the excess water poured off. Thirty-five parts of the copper chromite catalyst are distributed on the wet charcoal in the following manner: 5 parts of the catalyst are distributed evenly over the wet charcoal and the mass thoroughly mixed, which procedure is repeated until all the catalyst is dispersed on the charcoal. When all of the catalyst has been suspended on the charcoal the mass appears to be only slightly damp, all the excess water having been taken up by the catalyst.

*Part 2: Reduction of furfural*

Furfural was vaporized, the vapors were admixed with about five times the amount of hydrogen theoretically needed to reduce all the furfural to methylfuran and the resulting mixture was passed through the converter containing the catalyst which was preferably maintained at a temperature 200-225° C. The hydrogenation products consisting of water, methylfuran and unchanged furfural were condensed and the excess hydrogen was mixed with more furfural vapors and returned to the catalyst. After separating the water and organic layers the methylfuran was purified by distillation. The yield of methylfuran was 95 per cent. The catalyst was used intermittently over a period of three months, and at the end of this time it was still giving between 95-90% yields. The overall yield for the period was 91% and a weight of methylfuran was produced during this period which was 23 times that of the catalyst used.

*Part 3: Reduction of furfuryl alcohol*

The reduction was carried out with hydrogen in the same manner as given for the reduction of furfural. The yield of methylfuran was 70 per cent.

While the invention has been described in detail, particularly in connection with the example, it is, of course, to be understood that this is without intention in any way to limit the invention beyond the scope of the appended claims.

I claim:

1. A process for the production of methylfuran from a liquid furan derivative selected from the group consisting of furfural and furfuryl alcohol a reduction product of furfural which comprises vaporizing said furan derivative, admixing it with an amount of hydrogen gas more than sufficient to reduce all of the furan derivative to methylfuran and passing the mixture at a temperature of 140-280° C. over a porous mass comprising a carrier impregnated and coated with at least an equal weight of a catalyst prepared by decomposing a copper-calcium-chromate at a temperature of 300-450° C.

2. The process of claim 1 wherein the furan derivative is furfural.

3. The process of claim 1 wherein the furan derivative is furfuryl alcohol.

4. The process of claim 1 wherein the amount of hydrogen used is at least five times the theoretical amount necessary for the complete conversion of the furan derivative.

5. The process of claim 1 wherein the ratio of catalyst to carrier is 1.1 to 1.

6. The process of claim 1 wherein the ratio of catalyst to carrier is 1.16-1.20 to 1.

7. The process of claim 1 wherein the carrier is activated carbon of 4-10 mesh.

8. A process for the production of methylfuran from a liquid furan derivative selected from the group consisting of furfural and furfuryl alcohol a reduction product of furfural which comprises vaporizing said furan derivative, admixing it with an amount of hydrogen gas more than sufficient to reduce all of the furan derivative to methylfuran and passing the mixture at a temperature of 220-225° C. over a porous mass comprising a carrier impregnated and coated with at least an equal weight of a catalyst prepared by decomposing a copper-calcium-chromate at a temperature of 300-350° C.

ROBERT F. HOLDREN.

REFERENCES CITED

The following references are of record in the file of this patent:

UNITED STATES PATENTS

| Number | Name | Date |
|---|---|---|
| 1,739,919 | Ricard et al. | Dec. 17, 1929 |
| 1,903,850 | Peters | Apr. 18, 1933 |
| 2,077,422 | Lazier | Apr. 20, 1937 |
| 2,094,975 | Adkins | Oct. 5, 1937 |
| 2,273,484 | Guinot | Feb. 17, 1942 |

FOREIGN PATENTS

| Number | Country | Date |
|---|---|---|
| 505,600 | Great Britain | 1939 |

OTHER REFERENCES

"Furan and the Alkyl Furans," by Light, page 144, May 1942. (Copy in Div. 63.)